(12) United States Patent
Weeks

(10) Patent No.: US 9,365,711 B2
(45) Date of Patent: Jun. 14, 2016

(54) OLEFIN-BASED POLYMER COMPOSITIONS AND ARTICLES PREPARED THEREFROM

(71) Applicant: Ronald J. Weeks, Lake Jackson, TX (US)

(72) Inventor: Ronald J. Weeks, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/346,611

(22) PCT Filed: Sep. 21, 2012

(86) PCT No.: PCT/US2012/056444
§ 371 (c)(1),
(2) Date: Mar. 21, 2014

(87) PCT Pub. No.: WO2013/043944
PCT Pub. Date: Mar. 28, 2013

(65) Prior Publication Data
US 2014/0221559 A1     Aug. 7, 2014

Related U.S. Application Data

(60) Provisional application No. 61/538,173, filed on Sep. 23, 2011.

(51) Int. Cl.
*C08L 23/08* (2006.01)
*C08L 23/20* (2006.01)
(Continued)

(52) U.S. Cl.
CPC ............. *C08L 23/20* (2013.01); *C08L 23/0815* (2013.01); *C08L 23/06* (2013.01); *C08L 23/0869* (2013.01);
(Continued)

(58) Field of Classification Search
CPC ..... C08L 26/04; C08L 23/08; C08L 23/0815; C08L 23/16; C08L 23/0869; C08L 2205/03
USPC ............................................. 525/240; 428/95
See application file for complete search history.

(56) References Cited

U.S. PATENT DOCUMENTS 4,379,190 A    4/1983  Schenck
4,394,485 A    7/1983  Adur
(Continued)

FOREIGN PATENT DOCUMENTS

AU     2002100211 A4 *  4/2002    ............. C08L 23/04
CA         2042893 A1   11/1991
(Continued)

OTHER PUBLICATIONS

PCT/US2012/056444, International Preliminary Report on Patentability dated Mar. 25, 2014.
(Continued)

*Primary Examiner* — Rip A Lee

(57) ABSTRACT

The invention provides a composition comprising at least the following: A) an ethylene/a-olefin interpolymer with a density ≤0.90 g/cc, and an I2 greater than 10; B) a functionalized olefin-based polymer; and C) an olefin-based polymer with a density greater than 0.90 g/cc, and selected from the group consisting of the following: a) an ethylene homopolymer, b) an ethylene/α-olefin interpolymer, c) a propylene/ethylene interpolymer, and d) a propylene/α-olefin interpolymer; and wherein the [density (C)–density (A)] is greater than, or equal to, 0.017; and wherein the weight ratio of [(A+C)/B] is greater than, or equal to, 3.0.

18 Claims, 1 Drawing Sheet

(51) Int. Cl.
  *C09D 123/16* (2006.01)
  *C09D 123/04* (2006.01)
  *C08L 23/06* (2006.01)
  *C08L 51/06* (2006.01)

(52) U.S. Cl.
  CPC ............... *C08L 51/06* (2013.01); *C09D 123/04* (2013.01); *C09D 123/16* (2013.01); *D06N 2203/042* (2013.01)

(56) References Cited

U.S. PATENT DOCUMENTS

| | | |
|---|---|---|
| 4,403,007 A | 9/1983 | Coughlin |
| 4,434,258 A | 2/1984 | Schumacher et al. |
| 4,487,885 A | 12/1984 | Adur et al. |
| 4,619,859 A | 10/1986 | Yoshimura et al. |
| 4,722,858 A | 2/1988 | Harbourne et al. |
| 4,868,052 A | 9/1989 | Guerdoux et al. |
| 4,983,435 A | 1/1991 | Ueki et al. |
| 5,110,842 A | 5/1992 | Uejikkoku et al. |
| 5,424,362 A | 6/1995 | Hwang et al. |
| 5,445,860 A | 8/1995 | Bova |
| 5,819,392 A | 10/1998 | Rigosi et al. |
| 5,859,071 A | 1/1999 | Young et al. |
| 5,936,058 A | 8/1999 | Schauder |
| 6,177,516 B1 * | 1/2001 | Hudak ............... C08J 7/047 525/71 |
| 6,241,168 B1 | 6/2001 | Young et al. |
| 6,331,592 B1 | 12/2001 | Wong |
| 6,503,595 B1 * | 1/2003 | Kim ............... C08L 23/10 427/374.4 |
| 6,814,826 B1 | 11/2004 | Bell |
| 6,815,023 B1 | 11/2004 | Tatarka et al. |
| 6,835,777 B2 * | 12/2004 | Botros ............... C08K 5/098 525/191 |
| 7,338,698 B1 | 3/2008 | Bieser et al. |
| 7,357,971 B2 | 4/2008 | Bieser et al. |
| 7,820,728 B2 | 10/2010 | Wright et al. |
| 7,833,611 B2 | 11/2010 | Phan et al. |
| 8,283,017 B2 | 10/2012 | Bieser et al. |
| 8,617,686 B2 * | 12/2013 | Pepper et al. ............... 428/97 |
| 8,653,191 B2 | 2/2014 | Ansems et al. |
| 2002/0005250 A1 | 1/2002 | Jerdee et al. |
| 2005/0112320 A1 * | 5/2005 | Wright ............... B32B 5/18 428/95 |
| 2005/0266206 A1 | 12/2005 | Bieser et al. |
| 2006/0094824 A1 | 5/2006 | Roulin et al. |
| 2007/0087160 A1 | 4/2007 | Wright |
| 2007/0254131 A1 | 11/2007 | Shail et al. |
| 2008/0113146 A1 | 5/2008 | Wright et al. |
| 2008/0206583 A1 | 8/2008 | Phan et al. |
| 2010/0029827 A1 | 2/2010 | Ansems et al. |
| 2011/0008567 A1 * | 1/2011 | Weeks ............... B32B 27/12 428/95 |
| 2011/0120902 A1 | 1/2011 | Boswell et al. |
| 2012/0022188 A1 | 1/2012 | Changping et al. |

FOREIGN PATENT DOCUMENTS

| | | | |
|---|---|---|---|
| CA | 2331967 A1 | 11/1999 | |
| CN | 101318577 | 8/2011 | |
| EP | 0276570 A2 | 8/1988 | |
| EP | 479 457 A1 * | 9/1991 | ........... C09D 151/06 |
| EP | 0479457 A1 | 4/1992 | |
| GB | 2113696 A | 2/1924 | |
| GB | 2107325 A | 5/1983 | |
| JP | 59-215828 | 5/1986 | |
| JP | 61-62544 | 9/1987 | |
| JP | 3218829 | 9/1991 | |
| JP | 62-25139 | 1/2006 | |
| JP | 2009235635 | 1/2010 | |
| WO | 97/28960 A2 | 8/1997 | |
| WO | WO 02/26879 A1 * | 4/2002 | ............... C08L 23/04 |
| WO | 2006/127873 A1 | 11/2006 | |
| WO | 2009/086091 A1 | 7/2009 | |
| WO | WO 2009/086091 A1 * | 7/2009 | ............... B32B 3/00 |
| WO | 2011/005828 A1 | 1/2011 | |

OTHER PUBLICATIONS

PCT/US2012/056444, Written Opinion of the International Search Authority dated Mar. 23, 2014.
PCT/US2012/056444, International Search Report dated Mar. 28, 2013.
PCT/US2012/056444, Mar. 28, 2013.

* cited by examiner

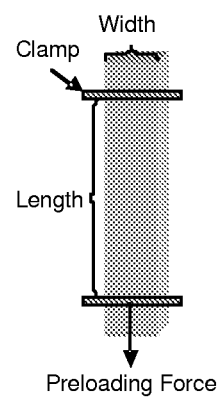

OLEFIN-BASED POLYMER COMPOSITIONS AND ARTICLES PREPARED THEREFROM

REFERENCE TO RELATED APPLICATIONS

The present application claims the benefit of U.S. Provisional Application No. 61/538,173, filed on Sep. 23, 2011, and incorporated herein by reference.

BACKGROUND OF THE INVENTION

Carpet backing formulations are prone to growth/buckling issues due to high growth forces that arise when the material is subjected to high temperatures. In general, these forces are related to the stiffness of the material, up to the point where the material begins to melt/soften. Historically, highly flexible, PVC-based formulations have been used for carpet backing formulations. But more recently, product safety and sustainability concerns have arisen about the use of products containing chlorine and/or various plasticizers, such as phthalates. For filled, olefin-based polymer formulations, growth forces are particularly critical in backing applications. In highly crystalline polymers, significant growth forces exist, such that buckling is common problem. Polymers of lower crystallinity require stiffening materials, such as fillers, to improve their properties for backing applications. However, these stiffening materials also cause expansion and buckling in the final compositions. Thus, there is a need for new polymer compositions that have reduced growth forces, and which can be used in carpets, and in particular, in carpet backing formulations, without causing expansion and buckling problems.

U.S. Pat. No. 6,241,168 discloses "carpet scrap containing mixtures" of polyesters and/or polyamides and polyolefins, and which are compatibilized with ultralow density polyethylene (ULDPE) to make homogeneous thermoplastic blends.

European Patent EP 0719301B1 discloses a polymeric blend, formed from recycled carpet scrap and selected compatibilizing agents and/or a poly(ethylene-co-vinylacetate), and the products produced from such blend.

U.S. Pat. No. 6,814,826 discloses processed waste carpeting as a filler in the production of a hot melt carpet backcoating, roofing materials, or other similar products. Waste carpeting (post-consumer and/or waste from new carpet manufacture) is collected and size-reduced, typically in a first, coarse size-reduction, and then, after densification, to a finer size-reduction. The size-reduced, waste carpeting is added as filler to at least one other material, such as polymers in a standard latex, EVA, or PVC carpet backcoatings, to provide a hot melt composite used in the manufacture of a product (like carpet backcoating). The waste carpeting may provide between about 40-100% of the filler of a carpet backcoating, with any remainder made up by conventional fillers, such as calcium carbonate.

US Publication No. 2008/0113146 discloses carpet and methods of making and recycling carpet. In one aspect, the carpet includes the following: a primary backing, which has a face and a back surface; a plurality of fibers attached to the primary backing, and extending from the face of the primary backing, and exposed at the back surface of the primary backing; an adhesive composition backing; and an optional secondary backing adjacent to the adhesive backing. The method of making carpet includes extrusion coating the adhesive composition onto the back surface of a primary backing, to form the adhesive composition backing. The method of recycling carpet can recover one or more polymeric carpet components.

U.S. Publication No. 2008/0206583 discloses a composition that includes at least one compatibilizer having at least one polyolefin and at least one polar group. The composition can include a blend of polymers. Surface coverings and floor coverings, such as laminated floor coverings, formed from the composition, are also described.

U.S. Pat. No. 7357971 discloses carpet and methods of making carpet. In one aspect, the carpet includes (a) a primary backing, (b) a plurality of fibers attached to the primary backing, (c) an adhesive backing, (d) an optional secondary backing adjacent to the adhesive backing, and (e) at least one homogeneously branched ethylene polymer. The method includes extrusion coating at least one homogeneously branched ethylene polymer onto the back surface of a primary backing to provide an adhesive backing. The preferred homogeneously branched ethylene polymer is a substantially linear ethylene polymer. See also U.S. Pat. No. 7,338,698 and EP0963476B1.

International Publication No. WO 2010/012041 discloses a composition comprising a very low density polyethylene having a density of less than 0.905 g/cm3, an ethylene acrylic acid copolymer, a thermoplastic starch and/or the constituent components thereof.

U.S. Publication No. 2006/0094824 discloses polymer compositions having elastomeric features, such as an extended elastic domain. The polymer compositions comprise a polyolefin; an ethylene vinyl acetate copolymer, an ethylene methyl acrylate copolymer, or a combination of an ethylene vinyl acetate copolymer and an ethylene methyl acrylate copolymer; a metallocene catalyzed polyethylene; and, optionally, an ethylene acid copolymer.

U.S. Pat. No. 6,815,023 discloses a polymer blend, and mono-and multilayer films made therefrom. The blend preferably has a first copolymer of ethylene and hexene-1, and having a copolymer melting point of 80 to 98° C., preferably of 80 to 92° C.; a second copolymer of ethylene and at least one alpha-olefin, and having a copolymer melting point of 115 to 128° C.; and a third copolymer of ethylene and a vinyl ester or alkyl acrylate, and having a melting point of 60 to 110° C.

U.S. Pat. NO. 5,936,058 discloses a composition comprising: a) 2 to 50 weight % of a first ethylene alpha-olefin copolymer having a density of 0.86 to 0.91 g/cc, a melt index of 150 g/10 min or less, and an Mw/Mn of 4 or less, and modified with an unsaturated acid or anhydride, and a second ethylene alpha-olefin copolymer having a density of 0.86 to 0.925 g/cm$^3$, and/or a homopolyethylene; and b) 98 to 50 weight percent of a thermoplastic polymer comprising a functional group capable of interacting with the unsaturated acid or anhydride.

U.S. Pat. No. 4,983,435 discloses an adhesive used between a polypropylene layer and an ethylene/vinyl alcohol copolymer layer. The adhesive composition comprises from 98.9 to 59.9%, by weight, of a modified polypropylene (A), partly or fully grafted with an unsaturated carboxylic acid or its derivative; from 1.0 to 40%, by weight, of an ethylene/ alpha-olefin copolymer (B), having a density from 0.915 to 0.940 g/cc, and a melting point from 115 to 130° C.; and 0.1%, by weight, or more, but less than 3%, by weight, of a hydrocarbon type synthetic elastomer (C).

European Patent Application EP 0479457A1 discloses polyolefin containing compositions comprising A), a high density polyethylene grafted with an unsaturated carboxylic acid or derivative, and B) a very low density polyethylene, and preferably either consist essentially of A and B, or also comprises C) another polyolefin, such as HDPE or LDPE.

U.S. Pat. No. 4,487,885 discloses resin blends comprising (a) a graft copolymer of a polyethylene backbone grafted with at least one grafting monomer, comprising one or more polymerizable ethylenically unsaturated carboxylic acids or acid derivatives, such as acid anhydrides, acid esters, salts, amides, imides and the like, (b) a LDPE, a linear low density polyethylene, or an ethylene-unsaturated ester copolymer and (c) a poly(alpha-olefin).

U.S. Pat. No. 4,394,485 discloses compositions comprising blends of a graft copolymer of a polyethylene backbone grafted with at least one grafting monomer, comprising one or more of polymerizable ethylenically unsaturated carboxylic acids or the anhydrides of such acids. The grafted copolymer is blended with a blending resin that is a mixture of one or more high density polyethylenes, one or more linear low density polyethylenes, and one or more polypropylenes.

U.S. Pat. No. 4,722,858 discloses a fire-retardant sheet material manufactured from a composition of polyethylene, and from 55 to 75%, by weight, of alumina trihydrate and/or magnesium hydroxide, and optionally zinc borate and/or calcium carbonate, and at least 2% by weight of the composition being in the form of a graft copolymer with an ethylenically unsaturated carboxylic acid or anhydride. The composition has a melt index of 0.05 to 4.0 dg/min U.S. Pat. No. 5,110,842 discloses an "electron-beam," cured sheet-type foam comprising the following: a polypropylene type resin (A) of 100 parts by weight; a copolymer resin (B) of 5 to 40 parts by weight, which is made of ethylene and at least one selected from the group consisting of acrylic acid, ethylacrylate, maleic acid anhydride, and vinylacetate; and a copolymer resin (C) made of ethylene and an alpha-olefin of 4 to 8 carbon atoms, and having a melting point of 117° C. to 123° C., and a density of 0.890 g/cm$^3$ to 0.910 g/cm$^3$. This foam contains 20 to 60 percent gel content, and has an expansion ratio of 5 to 40.

European Patent Application EP 0276570A2 discloses a method for the manufacture of film from blends of polyolefins. The blend is comprised of a polyethylene, and up to 20% by weight of a polyethylene grafted with 0.5 to 2.0%, by weight, of an ethylenically unsaturated carboxylic acid or anhydride, especially maleic anhydride. The polyethylene may be a homopolymer of ethylene or a copolymer of ethylene and a C4-C10 hydrocarbon alpha-olefin, especially so-called linear low density polyethylene.

Additional polyolefin compositions are disclosed in the following: International Publication Nos. WO 2006/127873, WO 2007/127222, WO 2009/086091, WO 2010/008371, WO 2008/080111, WO 2008/103887, and WO 1997/28960; U.S. Publication Nos. 2002/0005250, 2010/0029827A1, 2011/0008567 and 2011/0120902; and U.S. Pat. Nos. 5,424, 362, 5,819,392, 6,331,592, 4,868,052, 4,619,859, 4,868,052, 4,434,258, 4,403,007, 4,379,190; and CN 101318577A (Abstract), JP 3218829A (Abstract), JP 59-215828A (Abstract), JP 61-62544A (Abstract), JP2009235635A (Abstract), JP62025139A (Abstract), GB 2113696A, GB 2107325A, CA 2042893A1, CA 2331967A1, RD 280039A, and EP0688899A2.

However, the compositions of the art do not provide low growth carpet backing formulations designed to accommodate high modulus fillers, and preferably high levels of such fillers. There remains a need for new polymer compositions that have reduced growth forces, and which can be used in carpets, and in particular, in carpet backings, without causing expansion and buckling problems. This need and others have been met by the following invention.

SUMMARY OF THE INVENTION

The invention provides a composition comprising at least the following:
A) an ethylene/α-olefin interpolymer with a density less than, or equal to, 0.90 g/cc, I2 greater than 10;
B) a functionalized olefin-based polymer; and
C) an olefin-based polymer with a density greater than 0.90 g/cc, and selected from the group consisting of the following:
 a) an ethylene homopolymer,
 b) an ethylene/α-olefin interpolymer,
 c) a propylene/ethylene interpolymer, and
 d) a propylene/α-olefin interpolymer; and
wherein the [density (C)–density (A)] is greater than, or equal to, 0.017;
and wherein the weight ratio of [(A+C)/B] is greater than, or equal to, 3.0.

BRIEF DESCRIPTION OF THE DRAWINGS

FIG. 1 is a schematic depicting a sample loading in a Rheometric Solids Analyzer III (RSA III).

DETAILED DESCRIPTION OF THE INVENTION

As discussed above, the invention provides a composition comprising at least the following:
A) an ethylene/α-olefin interpolymer with a density less than, or equal to, 0.90 g/cc;
B) a functionalized olefin-based polymer; and
C) an olefin-based polymer with a density greater than 0.90 g/cc, and selected from the group consisting of the following:
 a) an ethylene homopolymer,
 b) an ethylene/α-olefin interpolymer,
 c) a propylene/ethylene interpolymer, and
 d) a propylene/α-olefin interpolymer; and
wherein the "density of the olefin-based polymer of component C–density of the ethylene/α-olefin interpolymer of component A or (density (C)–density (A))" is greater than, or equal to, 0.017; and
wherein the weight ratio of [(A+C)/B] is greater than, or equal to, 3.0.

An inventive composition may comprise a combination of two or more embodiments as described herein.

In one embodiment, the "density (C)–density (A)" is greater than, or equal to, 0.020.

In one embodiment, the "density (C)–density (A)" is greater than, or equal to, 0.025.

In one embodiment, the "density (C)–density (A)" is greater than, or equal to, 0.030.

In one embodiment, the "density (C)–density (A)" is greater than, or equal to, 0.035.

In one embodiment, the "density (C)–density (A)" is greater than, or equal to, 0.040.

In one embodiment, the weight ratio of "component A to component C" is greater than, or equal to, 1, or greater than, or equal to, 2, or greater than, or equal to, 3.

In one embodiment, the weight ratio of "component A to component C" is from 1 to 5.

In one embodiment, the weight ratio of [(A+C)/B] is greater than, or equal to, 4.0, or greater than, or equal to, 5.0.

In one embodiment, the weight ratio of [(A+C)/B] is greater than, or equal to, 6.0, or greater than, or equal to, 7.0.

In one embodiment, the α-olefin of the ethylene/α-olefin interpolymer of component A is a C3-C10 α-olefin. In a further embodiment, the ethylene/α-olefin interpolymer is an ethylene/α-olefin copolymer.

In one embodiment, the ethylene/α-olefin interpolymer of component A has a melt index (I2) greater than, or equal to, 15 g/10 min, or greater than, or equal to, 20 g/10 min, or greater than, or equal to, 25 g/10 min, or greater than, or equal to, 30 g/10 min.

In one embodiment, the ethylene/α-olefin interpolymer of component A has a melt index (I2) from 10 to 200 g/10 min, or from 15 to 50 g/10 min, or from 20 to 100 g/10 min, or from 25 to 50 g/10 min.

In one embodiment, component B is present in an amount less than, or equal to, 4 weight percent, based on the weight of the composition.

In one embodiment, the functionalized olefin-based polymer comprises COOH groups and/or anhydride groups.

In one embodiment, the functionalized olefin-based polymer has a density from 0.86 to 0.95 g/cc (1 cc=1 cm$^3$).

In one embodiment, the functionalized olefin-based polymer has a melt index (I2: 2.16 kg/190° C.) from 0.2 g/10 min to 50 g/10 min, or from 0.5 g/10 min to 20 g/10 min, or from 1 g/10 min to 10 g/10 min.

In one embodiment, the functionalized olefin-based polymer is selected from a functionalized ethylene-based polymer or a functionalized propylene-based polymer.

In one embodiment, the functionalized olefin-based polymer is a functionalized propylene-based polymer, further a functionalized propylene-based interpolymer, and further a functionalized propylene-based copolymer.

In one embodiment, the functionalized olefin-based polymer is a functionalized ethylene-based polymer, further a functionalized ethylene-based interpolymer, and further a functionalized ethylene-based copolymer.

In one embodiment, the functionalized ethylene-based polymer comprises units derived from ethylene and an acrylic acid or an acrylate. In a further embodiment, the acrylate is selected from ethylacrylate, methylacrylate or butylacrylate.

In one embodiment, the functionalized ethylene-based polymer comprises units derived from ethylene and an acrylate. In a further embodiment, the acrylate is selected from ethylacrylate, methylacrylate or butylacrylate.

In one embodiment, the functionalized ethylene-based polymer comprises units derived from ethylene and maleic anhydride and/or maleic acid.

In one embodiment, the functionalized ethylene-based polymer has a density from 0.86 to 0.95 g/cc.

In one embodiment, the composition has a density less than, or equal to, 0.900 g/cc.

In one embodiment, the composition has a melt index (I2) greater than 10 g/10 min.

In one embodiment, the composition comprises from 2 to 50 wt %, or from 5 to 30 wt %, or from 10 to 20 wt % of the ethylene/α-olefin interpolymer of component A, based on the weight of the composition.

In one embodiment, the composition comprises from 0.5 to 30 wt %, or from 1 to 20 wt %, or from 1.5 to 10 wt % of the functionalized olefin-based polymer of component B, based on the weight of the composition.

In one embodiment, the composition comprises from 2 to 30 wt %, or from 4 to 20 wt %, or from 6 to 15 wt % of the olefin-based polymer of component C, based on the weight of the composition.

In one embodiment, the composition further comprises one or more additives. In a further embodiment, the one or more additives are selected from fillers, tackifiers, or combinations thereof.

Examples of tackifiers include, but are not limited to, rosin derivatives, such as wood rosin, tall oil, gum rosin; rosin esters, natural and synthetic terpenes, and derivatives of such; and aliphatic, aromatic or mixed aliphatic-aromatic petroleum based tackifiers. Representative examples of hydrocarbon resins (as tackifiers) include alpha-methyl styrene resins, branched and unbranched C5 resins, C9 resins, C10 resins, as well as styrenic and hydrogenated modifications of such.

The invention also provides an article comprising at least one component formed from the composition of any of the previous embodiments or other embodiments described herein.

In one embodiment, the article is a carpet.

An inventive composition may comprise a combination of two or more embodiments as described herein.

The ethylene/α-olefin interpolymer of component A may comprise a combination of two or more embodiments as described herein.

The functionalized olefin-based polymer of component B may comprise a combination of two or more embodiments as described herein.

The olefin-based polymer of component C may comprise a combination of two or more embodiments as described herein.

An inventive article may comprise a combination of two or more embodiments as described herein.

Ethylene/α-olefin Interpolymer (Component A)

Ethylene/α-olefin interpolymers include polymers formed by polymerizing ethylene with one or more, and preferably one, C3-C10 α-olefin(s). Illustrative α-olefins include propylene, 1-butene, 1-pentene, 1-hexene, 4-methyl-1-pentene, 1-heptene, 1-octene, 1-nonene and 1-decene. Preferably, the α-olefin is propylene, 1-butene, 1-hexene or 1-octene. Preferred copolymers include ethylene/propylene (EP) copolymers, ethylene/butene (EB) copolymers, ethylene/hexene (EH) copolymers, ethylene/octene (EO) copolymers.

Commercial examples of suitable ethylene/α-olefin interpolymers include, but are not limited to, ENGAGE Polyolefin Elastomers available from The Dow Chemical Company; EXCEED and EXACT polymers available from ExxonMobil Chemical Company; and TAFMER polymers available from the Mitsui Chemical Company.

In one embodiment, the ethylene/α-olefin interpolymer has a melting point (Tm) greater than 40° C., or greater than 45° C., or greater than 50° C., as determined by DSC. In a further embodiment, the ethylene/α-olefin interpolymer is an ethylene/α-olefin copolymer.

In one embodiment, the ethylene/α-olefin interpolymer has a melting point (Tm) less than 100° C., or less than 90° C., or less than 80° C., as determined by DSC. In a further embodiment, the ethylene/α-olefin interpolymer is an ethylene/α-olefin copolymer.

In one embodiment, the ethylene/α-olefin interpolymer has a percent crystallinity of less than, or equal to, 40 percent, or less than, or equal to, 35 percent, or less than, or equal to, 30 percent, or less than, or equal to, 25 percent, or less than, or equal to, 15 percent, as measured by DSC. In a further embodiment, the ethylene/α-olefin interpolymer is an ethylene/α-olefin copolymer.

In one embodiment, the ethylene/α-olefin interpolymer has a percent crystallinity of greater than, or equal to, 2 percent, or greater than, or equal to, 5 percent, or greater than, or equal to, 8 percent, as measured by DSC. In a further embodiment, the ethylene/α-olefin interpolymer is an ethylene/α-olefin copolymer.

In one embodiment, the ethylene/α-olefin interpolymer has a density greater than, or equal to, 0.850 g/cc, or greater than, or equal to, 0.855 g/cc, or greater than, or equal to, 0.860 g/cc. In a further embodiment, the ethylene/α-olefin interpolymer is an ethylene/α-olefin copolymer.

In one embodiment, the ethylene/α-olefin interpolymer has a density less than, or equal to, 0.900 g/cc, or less than, or equal to, 0.895 g/cc, or less than, or equal to, 0.890 g/cc. In a further embodiment, the ethylene/α-olefin interpolymer is an ethylene/α-olefin copolymer.

In one embodiment, the ethylene/α-olefin interpolymer has a melt index (I2) greater than 10 g/10 min, or greater than, or equal to, 15 g/10 min, or greater than, or equal to, 20 g/10 min. In a further embodiment, the ethylene/α-olefin interpolymer is an ethylene/α-olefin copolymer.

In one embodiment, the ethylene/α-olefin interpolymer has a melt index (I2) less than, or equal to, 500 g/10 min, or less than, or equal to, 200 g/10 min, or less than, or equal to, 100 g/10 min, or less than, or equal to, 50 g/10 min. In a further embodiment, the ethylene/α-olefin interpolymer is an ethylene/α-olefin copolymer.

In one embodiment, the ethylene/α-olefin interpolymer has molecular weight distribution (Mw/Mn) greater than, or equal to, 1.1, or greater than, or equal to, from 1.2, or greater than, or equal to, 1.5, or greater than, or equal to, 1.7, as determined by GPC. In a further embodiment, the ethylene/α-olefin interpolymer is an ethylene/α-olefin copolymer.

In one embodiment, the ethylene/α-olefin interpolymer has molecular weight distribution (Mw/Mn) less than, or equal to, 4.0, or less than, or equal to, from 3.5, or less than, or equal to, 2.5, or less than, or equal to, 2.1, as determined by GPC. In a further embodiment, the ethylene/α-olefin interpolymer is an ethylene/α-olefin copolymer.

In one embodiment, the ethylene/α-olefin interpolymer is a homogeneously branched linear interpolymer, and preferably a copolymer, or a homogeneous branched substantially linear interpolymer, and preferably a copolymer.

In one embodiment, the ethylene/α-olefin interpolymer is a homogeneous branched substantially linear interpolymer, and preferably a copolymer.

In one embodiment, the ethylene/α-olefin interpolymer is a homogeneous branched linear interpolymer, and preferably a copolymer.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio.

The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. These ethylene/α-olefin interpolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. Nos. 4,701,432; 4,937,301; 4,935,397; 5,055,438; and WO 90/07526; each incorporated herein by reference. As discussed, the homogeneously branched linear ethylene interpolymers lack long chain branching, just as is the case for the linear low density polyethylene polymers or linear high density polyethylene polymers. Commercial examples of homogeneously branched linear ethylene/α-olefin interpolymers include TAFMER polymers from the Mitsui Chemical Company, and EXACT and EXCEED polymers from ExxonMobil Chemical Company.

The homogeneously branched substantially linear ethylene/α-olefin interpolymers are described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone.

The substantially linear ethylene/α-olefin interpolymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene/α-olefin interpolymers useful in the invention have excellent processability, even though they have a relatively narrow molecular weight distribution. Surprisingly, the melt flow ratio (I10/I2), according to ASTM D 1238, of the substantially linear ethylene interpolymers can be varied widely, and essentially independently of the molecular weight distribution (Mw/Mn or MWD). This surprising behavior is contrary to conventional homogeneously branched linear ethylene interpolymers, such as those described, for example, by Elston in U.S. Pat. No. 3,645,992, and heterogeneously branched, conventional "Ziegler-Natta polymerized," linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the I10/I2 value also increases.

Long chain branching can be determined by using 13C Nuclear Magnetic Resonance (NMR) spectroscopy, and can be quantified using the method of Randall (Rev. Macromol. Chem. Phys., C29 (2 & 3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17,1301(1949) and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

In one embodiment, the ethylene/α-olefin interpolymer has a PRR (Processing Rheology Ratio) greater than, or equal to, 4, or greater than, or equal to, 8, or greater than, or equal to, 12, or greater than, or equal to, 15. In a further embodiment, the ethylene/α-olefin interpolymer is an ethylene/α-olefin copolymer.

In one embodiment, the ethylene/α-olefin interpolymer has a PRR from 4 to 70, or from 8 to 65, or from 12 to 60. In a further embodiment, the ethylene/α-olefin interpolymer is an ethylene/α-olefin copolymer.

Interpolymer viscosity is conveniently measured in poise (dyne-second/square centimeter (d-sec/cm$^2$)) at shear rates within a range of 0.1-100 radian per second (rad/sec), at 190° C., under a nitrogen atmosphere, using a dynamic mechanical spectrometer (such as a RMS-800 or ARES from Rheometrics), under a dynamic sweep made from 0.1 to 100 rad/sec. The viscosities at 0.1 rad/sec and 100 rad/sec may be represented, respectively, as "V0.1" and "V100," with a ratio of the two referred to as "RR," and expressed as "V0.1/V100."

The PRR value is calculated by the formula: PRR=RR+ [3.82−interpolymer Mooney Viscosity (ML1+4 at 125° C)]× 0.3. The PRR determination is described in U.S. Pat. No. 6,680,361 (see also equivalent WO 00/26268), fully incorporated herein by reference.

An ethylene/α-olefin interpolymer may comprise a combination of two or more embodiments as described herein.

An ethylene/α-olefin copolymer may comprise a combination of two or more embodiments as described herein.

Olefin-Based Polymers (Component C)

The olefin-based polymer of component C is selected from the group consisting of the following: a) an ethylene homopolymer, b) an ethylene/α-olefin interpolymer, c) a propylene/ethylene interpolymer, and d) a propylene/α-olefin interpolymer.

In one embodiment, the olefin-based polymer is a recycled olefin-based polymer.

In one embodiment, the olefin-based polymer of component C is selected from the group consisting of the following: a) an ethylene homopolymer, and b) an ethylene/α-olefin interpolymer.

In one embodiment, the olefin-based polymer of component C is selected from the group consisting of the following: c) a propylene/ethylene interpolymer, and d) a propylene/α-olefin interpolymer.

In one embodiment, the olefin-based polymer of component C is an ethylene homopolymer.

In one embodiment, the olefin-based polymer of component C is an ethylene/α-olefin interpolymer. In a further embodiment, the ethylene/α-olefin interpolymer is an ethylene/α-olefin copolymer.

In one embodiment, the olefin-based polymer of component C is a propylene/ethylene interpolymer. In a further embodiment, the propylene/ethylene interpolymer is a propylene/ethylene copolymer.

In one embodiment, the olefin-based polymer of component C is a propylene/α-olefin interpolymer. In a further embodiment, the propylene/α-olefin interpolymer is a propylene/α-olefin copolymer.

The olefin-based polymer (component C) may comprise a combination of two or more embodiments as described herein.

Ethylene Homopolymer (Component C)

In one embodiment, the olefin-based polymer of component C is ethylene homopolymer. In a further embodiment, the ethylene homopolymer is a HDPE (high density polyethylene).

In one embodiment, the olefin-based polymer of component C is ethylene homopolymer. In a further embodiment, the ethylene homopolymer is a LDPE (low density polyethylene).

In one embodiment, the ethylene homopolymer, or further a LDPE, has a density greater than 0.900 g/cc, or greater than, or equal to, 0.905 g/cc, or greater than, or equal to, 0.910 g/cc.

In one embodiment, the ethylene homopolymer, or further a LDPE, has a density less than, or equal to, 0.950 g/cc, or less than, or equal to, 0.940 g/cc, or less than, or equal to, 0.930 g/cc.

In one embodiment, the ethylene homopolymer, or further a LDPE, has a melt index (I2) greater than, or equal to, 2 g/10 min, or greater than, or equal to, 5 g/10 min, or greater than, or equal to, 10 g/10 min.

In one embodiment, the ethylene homopolymer, or further a LDPE, has a melt index (I2) less than, or equal to, 50 g/10 min, or less than, or equal to, 30 g/10 min, or less than, or equal to, 10 g/10 min.

An ethylene homopolymer (component C) may comprise a combination of two or more embodiments as described herein.

A LDPE (component C) may comprise a combination of two or more embodiments as described herein.

Ethylene/α-Olefin Interpolymer (Component C)

In one embodiment, the olefin-based polymer of component C is an ethylene/α-olefin interpolymer, and preferably an ethylene/α-olefin copolymer.

Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

In one embodiment, the ethylene/α-olefin interpolymer has a molecular weight distribution (Mw/Mn) less than, or equal to, 5.0, or less than, or equal to, 4.0, or less than, or equal to, 3.0. In a further embodiment, the ethylene/α-olefin interpolymer is an ethylene/α-olefin copolymer.

In one embodiment, the ethylene/α-olefin interpolymer has a molecular weight distribution (Mw/Mn) greater than, or equal to, 1.2, or greater than, or equal to, 1.5, or greater than, or equal to, 1.7. In a further embodiment, the ethylene/α-olefin interpolymer is an ethylene/α-olefin copolymer.

In one embodiment, the ethylene/α-olefin interpolymer has a melt index (I2) greater than, or equal to, 1 g/10 min, or greater than, or equal to, 3 g/10 min, or greater than, or equal to, 5 g/10 min. In a further embodiment, the ethylene/α-olefin interpolymer is an ethylene/α-olefin copolymer.

In one embodiment, the ethylene/α-olefin interpolymer has a melt index (I2) less than, or equal to, 50 g/10 min, or less than, or equal to, 25 g/10 min, or less than, or equal to, 12 g/10 min. In a further embodiment, the ethylene/α-olefin interpolymer is an ethylene/α-olefin copolymer.

In one embodiment, the ethylene/α-olefin interpolymer has a density greater than 0.900 g/cc, or greater than, or equal to, 0.902 g/cc, or greater than, or equal to, 0.905 g/cc. In a further embodiment, the ethylene/α-olefin interpolymer is an ethylene/α-olefin copolymer.

In one embodiment, the ethylene/α-olefin interpolymer has a density less than, or equal to, 0.950 g/cc, or less than, or equal to, 0.940 g/cc, or less than, or equal to, 0.930 g/cc. In a further embodiment, the ethylene/α-olefin interpolymer is an ethylene/α-olefin copolymer.

Some examples of ethylene/α-olefin copolymers include, but are not limited to, ENGAGE Polyolefin Elastomers and AFFINITY Polyolefin Plastomers, both available from The Dow Chemical Company.

In one embodiment, the ethylene/α-olefin interpolymer is a homogeneously branched linear interpolymer, and preferably a copolymer, or a homogeneous branched substantially linear interpolymer, and preferably a copolymer.

In one embodiment, the ethylene/α-olefin interpolymer is a homogeneously branched linear interpolymer, and preferably a copolymer.

In one embodiment, the ethylene/α-olefin interpolymer is a homogeneous branched substantially linear interpolymer, and preferably a copolymer.

An ethylene/α-olefin interpolymer may comprise a combination of two or more embodiments as described herein.

An ethylene/α-olefin copolymer may comprise a combination of two or more embodiments as described herein.

Propylene/Ethylene Interpolymer and Propylene/α-olefin Interpolymer (Component C)

In one embodiment, the olefin-based polymer is a propylene/α-olefin interpolymer, and further a copolymer; or a propylene/ethylene interpolymer, and further a copolymer.

Preferred comonomers include, but are not limited to, C2 (ethylene) and C4-C20 α-olefins, and preferably C2 (ethylene) and C4-C10 α-olefins. Preferred comonomers include ethylene, 1-butene, 1-pentene, 1-hexene, 1-heptene and 1-octene, and more preferably include ethylene, 1-butene, 1-hexene and 1-octene, and even more preferably ethylene.

Propylene/α-olefin interpolymers and propylene/ethylene interpolymers include, but are not limited to, VERSIFY Plastomers (The Dow Chemical Company), VISTAMAXX polymers (ExxonMobil Chemical Co.), LICOCENE polymers (Clariant), EASTOFLEX polymers (Eastman Chemical Co.), REXTAC polymers (Hunstman), and VESTOPLAST polymers (Degussa), and other propylene-based polymers known in the art.

In one embodiment, the propylene/α-olefin interpolymer or the propylene/ethylene interpolymer has a molecular weight distribution less than, or equal to, 5.0, or less than, or equal to, 4.5, or less than, or equal to, 4.0. In a further embodiment, the interpolymer is a propylene/α-olefin interpolymer, and further a propylene/α-olefin copolymer. In another embodiment, the interpolymer is a propylene/ethylene interpolymer, and further a propylene/ethylene copolymer.

In one embodiment, the propylene/α-olefin interpolymer or the propylene/ethylene interpolymer has a molecular weight distribution greater than, or equal to, 2.0, or greater than, or equal to, 3.5, or greater than, or equal to, 3.0. In a further embodiment, the interpolymer is a propylene/α-olefin interpolymer, and further a propylene/α-olefin copolymer. In another embodiment, the polymer is a propylene/ethylene interpolymer, and further a propylene/ethylene copolymer.

In one embodiment, the propylene/α-olefin interpolymer or the propylene/ethylene interpolymer has a percent crystallinity of less than, or equal to, 80 percent, or less than, or equal to, 60 percent, or less than, or equal to, 40 percent, as measured by DSC. In a further embodiment, the interpolymer is a propylene/α-olefin interpolymer, and further a propylene/α-olefin copolymer. In another embodiment, the interpolymer is a propylene/ethylene interpolymer, and further a propylene/ethylene copolymer.

In one embodiment, the propylene/α-olefin interpolymer or the propylene/ethylene interpolymer has a percent crystallinity of greater than, or equal to, 2 percent, or greater than, or equal to, 5 percent, or greater than, or equal to, 10 percent, as measured by DSC. In a further embodiment, the interpolymer is a propylene/α-olefin interpolymer, and further a propylene/α-olefin copolymer. In another embodiment, the interpolymer is a propylene/ethylene interpolymer, and further a propylene/ethylene copolymer.

In one embodiment, the propylene/α-olefin interpolymer or the propylene/ethylene interpolymer has a density greater than 0.900 g/cc, or greater than, or equal to, 0.902 g/cc, or greater than, or equal to, 0.905 g/cc. In a further embodiment, the interpolymer is a propylene/α-olefin interpolymer, and further a propylene/α-olefin copolymer. In another embodiment, the interpolymer is a propylene/ethylene interpolymer, and further a propylene/ethylene copolymer.

In one embodiment, the propylene/α-olefin interpolymer or the propylene/ethylene interpolymer has a density less than, or equal to, 0.930 g/cc, or less than, or equal to, 0.920 g/cc, or less than, or equal to, 0.910 g/cc. In a further embodiment, the interpolymer is a propylene/α-olefin interpolymer, and further a propylene/α-olefin copolymer. In another embodiment, the interpolymer is a propylene/ethylene interpolymer, and further a propylene/ethylene copolymer.

A propylene/α-olefin interpolymer, or copolymer, may comprise a combination of two or more embodiments as described herein.

A propylene/ethylene interpolymer, or copolymer, may comprise a combination of two or more embodiments as described herein.

Functionalized Olefin-based Polymer (Component B)

The term "functional group," as used herein, refers to a chemical substituent containing at least one hetero-atom. A heteroatom is defined as an atom which is not carbon or hydrogen. Common heteroatoms include, but are not limited to, oxygen, nitrogen, sulfur, phosphorus.

The term "functionalization agent," as used herein, refers to an organic compound containing at least one functional group (for example, maleic anhydride) that can react with a carbon atom located on the backbone of the olefin-based polymer.

The term "functionalized olefin-based polymer," as used herein, refers to an olefin-based polymer that comprises at least one chemical group (chemical substituent), linked by a covalent bond, and which group comprises at least one hetero-atom. A heteroatom is defined as an atom which is not carbon or hydrogen. Common heteroatoms include, but are not limited to, oxygen, nitrogen, sulfur, phosphorus.

The term "functionalized ethylene-based polymer," as used herein, refers to an ethylene-based polymer that comprises at least one chemical group (chemical substituent), linked by a covalent bond, and which group comprises at least one hetero-atom. A heteroatom is defined as an atom which is not carbon or hydrogen. Common heteroatoms include, but are not limited to, oxygen, nitrogen, sulfur, phosphorus.

The term "functionalized propylene-based polymer," as used herein, refers to a propylene-based polymer that comprises at least one chemical group (chemical substituent), linked by a covalent bond, and which group comprises at least one hetero-atom. A heteroatom is defined as an atom which is not carbon or hydrogen. Common heteroatoms include, but are not limited to, oxygen, nitrogen, sulfur, phosphorus.

Functionalized olefin-based polymers include, but are not limited to, functionalized ethylene-based polymers and functionalized propylene-based polymers. Some polar groups that serve as the functionalization moiety include, for example, carboxylic acid (for example, EAA); methyl, ethyl, butyl and other R-carboxylates (for example, EMA, EEA, EBA), maleic anhydride (for example, PE-gr-MAH), imide, amine, glycidyl (for example, GMA), carbon monoxide (for example, ECO), H-Tempo functionalized, silane and siloxane functionalized.

Additional functionalized olefin-based polymers include, but are not limited to, ethylene acrylic acid copolymers (EAA); ethylene acrylate copolymers (such as ethylene butyl-acrylate copolymers, ethylene ethyl-acrylate copolymers and ethylene methyl-acrylate copolymers (EBAs, EEAs and EMAs)); ethylene/butyl acrylate/carbon monoxide (EnBACO); ethylene ethylacrylate polymers (EEA), as well as functionally modified polyolefins, such as silane-grafted olefin-based polymer or maleic anhydride grafted olefin-based polymer; ethylene/butyl acrylate/glycidyl methyacrylate (EnBAGMA); ethylene methacrylic acid (E/MAA); ethylene vinyl alcohol; or combinations of two or more of these polymers.

In one embodiment, the functionalized olefin-based polymer comprises at least one polymerized comonomer or reacted functionalization agent, each containing at least one functional group selected from the following:

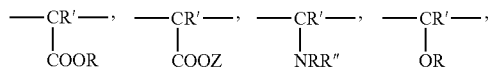

imide, amide, anhydride, dicarboxylates, glycidyl, carbon monoxide, polar group derived from H-TEMPO or an H-TEMPO derivative, silane, or siloxane; and wherein R is hydrogen or alkyl, R' is hydrogen or alkyl, R" is hydrogen or alkyl, and Z is Na+ or K+. In a further embodiment, each alkyl group is, independently, methyl, ethyl, propyl or butyl. In one embodiment, the functionalized olefin-based polymer is a functionalized ethylene-base polymer. In another embodiment, the functionalized olefin-based polymer is a functionalized propylene-base polymer.

In one embodiment, the functionalized olefin-based polymer comprises at least one polymerized comonomer or reacted functionalization agent, each containing at least one functional group selected from the following:

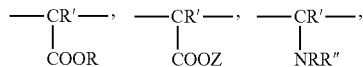

imide, amide, anhydride, dicarboxylates; and wherein R is hydrogen or alkyl, R' is hydrogen or alkyl, R" is hydrogen or alkyl, and Z is Na+ or K+. In a further embodiment, each alkyl group is, independently, methyl, ethyl, propyl or butyl. In one embodiment, the functionalized olefin-based polymer is a functionalized ethylene-base polymer. In another embodiment, the functionalized olefin-based polymer is a functionalized propylene-base polymer.

In one embodiment, the functionalized olefin-based polymer comprises at least one polymerized comonomer or reacted functionalization agent, each containing at least one functional group selected from the following:

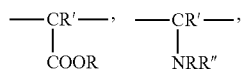

imide, amide, anhydride; and wherein R is hydrogen or alkyl, R' is hydrogen or alkyl, R" is hydrogen or alkyl. In a further embodiment, each alkyl group is, independently, methyl, ethyl, propyl or butyl. In one embodiment, the functionalized olefin-based polymer is a functionalized ethylene-base polymer. In another embodiment, the functionalized olefin-based polymer is a functionalized propylene-base polymer.

In one embodiment, the functionalized olefin-based polymer comprises at least one polymerized comonomer or reacted functionalization agent, each containing at least one functional group selected from the following:

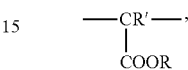

anhydride; and wherein R is hydrogen or alkyl, R' is hydrogen or alkyl. In a further embodiment, each alkyl group is, independently, methyl, ethyl, propyl or butyl. In one embodiment, the functionalized olefin-based polymer is a functionalized ethylene-base polymer. In another embodiment, the functionalized olefin-based polymer is a functionalized propylene-base polymer.

In one embodiment, the functionalized olefin-based polymer is a functionalized ethylene-based polymer that comprises units derived from ethylene and an anhydride, and preferably maleic anhydride. In a further embodiment, the functionalized ethylene-based polymer further comprises an alpha-olefin, and further a C3-C10 alpha-olefin. Suitable alpha-olefins are described above.

In one embodiment, the functionalized olefin-based polymer is a functionalized propylene-based polymer that comprises units derived from ethylene and an anhydride, and preferably maleic anhydride. In a further embodiment, the functionalized propylene-based polymer further comprises ethylene or an alpha-olefin, and further ethylene or a C4-C10 alpha-olefin. Suitable alpha-olefins are described above.

In one embodiment, the functionalized olefin-based polymer is a functionalized ethylene-base polymer, selected from the group consisting of polyethylene acrylic acid copolymer, an anhydride grafted polyethylene, ethylene butylacrylate, ethylene glycidyl methacrylate, ethylene methacrylic acid, and combinations thereof.

In one embodiment, the functionalized olefin-based polymer has a density from 0.860 to 0.965 g/cc, or from 0.865 to 0.960 g/cc, or from 0.870 to 0.955 g/cc. In one embodiment, the functionalized olefin-based polymer is a functionalized ethylene-base polymer. In another embodiment, the functionalized olefin-based polymer is a functionalized propylene-base polymer.

In one embodiment, the functionalized olefin-based polymer has a melt index (I2: 2.16 kg/190° C.) from 0.5 g/10 min to 50 g/10 min, or from 1 g/10 min to 30 g/10 min, or from 5 g/10 min to 20 g/10 min. In one embodiment, the functionalized olefin-based polymer is a functionalized ethylene-base polymer. In another embodiment, the functionalized olefin-based polymer is a functionalized propylene-base polymer.

Suitable commercial functionalized olefin-based polymers include PRIMACOR Copolymers and AMPLIFY Functional Polymers, both available from The Dow Chemical Company; SURLYN (available from DuPont), IOTEK (available from ExxonMobil), LOTADER (available from Arkema), NUCREL (available from DuPont), BYNEL (available from DuPont), PLEXAR (available from Lyondell), and TYMOR (available from Rohm Haas).

In one embodiment, the functionalized olefin-based polymer is a functionalized ethylene-based polymer that is formed from at least one comonomer and/or functionalization agent, each containing at least one functional group, and an ethylene/alpha-olefin interpolymer, and further an ethylene/alpha-olefin copolymer. Suitable alpha-olefins are described above. In a further embodiment, the alpha-olefin is a C3-C10 alpha-olefin. Some examples of functional groups are discussed above, including anhydride and/or carboxylic acid groups.

In one embodiment, the functionalized olefin-based polymer is a functionalized propylene-based polymer that is formed from at least one comonomer or functionalization agent, each containing at least one functional group, and a propylene/alpha-olefin interpolymer, and further a propylene/alpha-olefin copolymer. Suitable alpha-olefins are described above. In a further embodiment, the alpha-olefin is a C4-C10 alpha-olefin. Some examples of functional groups are discussed above, including anhydride and/or carboxylic acid groups.

In one embodiment, the functionalized olefin-based polymer is a functionalized propylene-based polymer that is formed from at least one comonomer or functionalization agent, each containing at least one functional group, and a propylene/ethylene interpolymer, and further a propylene/ethylene copolymer. Some examples of functional groups are discussed above, including anhydride and/or carboxylic acid groups.

In one embodiment, the functionalized olefin-based polymer is a functionalized ethylene-based polymer that is formed from at least one comonomer containing at least one functional group, and an ethylene/alpha-olefin interpolymer, and further an ethylene/alpha-olefin copolymer. Suitable alpha-olefins are described above. In a further embodiment, the alpha-olefin is a C3-C10 alpha-olefin. Some examples of functional groups are discussed above, including anhydride and/or carboxylic acid groups.

In one embodiment, the functionalized olefin-based polymer is a functionalized propylene-based polymer that is formed from at least one comonomer containing at least one functional group, and a propylene/alpha-olefin interpolymer, and further a propylene/alpha-olefin copolymer. Suitable alpha-olefins are described above. In a further embodiment, the alpha-olefin is a C4-C10 alpha-olefin. Some examples of functional groups are discussed above, including anhydride and/or carboxylic acid groups.

In one embodiment, the functionalized olefin-based polymer is a functionalized propylene-based polymer that is formed from at least one comonomer containing at least one functional group, and a propylene/ethylene interpolymer, and further a propylene/ethylene copolymer. Some examples of functional groups are discussed above, including anhydride and/or carboxylic acid groups.

In one embodiment, the functionalized olefin-based polymer is a functionalized ethylene-based polymer that is formed from at least one functionalization agent containing at least one functional group, and an ethylene/alpha-olefin interpolymer, and further an ethylene/alpha-olefin copolymer. Suitable alpha-olefins are described above. In a further embodiment, the alpha-olefin is a C3-C10 alpha-olefin. Some examples of functional groups are discussed above, including anhydride and/or carboxylic acid groups.

In one embodiment, the functionalized olefin-based polymer is a functionalized propylene-based polymer that is formed from at least one functionalization agent containing at least one functional group, and a propylene/alpha-olefin interpolymer, and further a propylene/alpha-olefin copolymer. Suitable alpha-olefins are described above. In a further embodiment, the alpha-olefin is a C4-C10 alpha-olefin. Some examples of functional groups are discussed above, including anhydride and/or carboxylic acid groups.

In one embodiment, the functionalized olefin-based polymer is a functionalized propylene-based polymer that is formed from at least one functionalization agent containing at least one functional group, and a propylene/ethylene interpolymer, and further a propylene/ethylene copolymer. Some examples of functional groups are discussed above, including anhydride and/or carboxylic acid groups.

A functionalized olefin-based polymer may comprise a combination of two or more embodiments as described herein.

A functionalized ethylene-based polymer may comprise a combination of two or more embodiments as described herein.

A functionalized propylene-based polymer may comprise a combination of two or more embodiments as described herein.

Additives

In one embodiment, an inventive composition comprises at least one additive. Suitable additives include, but are not limited to, fillers, tackifiers, antioxidants, UV stabilizers, foaming agents, flame retardants, colorants or pigments, and combinations thereof.

In one embodiment, the composition comprises at least one filler. In a further embodiment, the filler is selected from carbon black, talc, calcium carbonate, clay, coal fly ash, natural fillers (for example, coal fly ash, cursh) or combinations thereof. In a further embodiment, the filler is selected from carbon black, talc, calcium carbonate, clay, or combinations thereof. In one embodiment, the filler is present in an amount less than, or equal to, 70 weight percent, or less than, or equal to, 60 weight percent, or less than, or equal to, 50 weight percent, based on the weight of the composition. In one embodiment, the filler is present in an amount greater than, or equal to, 2 weight percent, or greater than, or equal to, 5 weight percent, or greater than, or equal to, 10 weight percent based on the weight of the composition. In a further embodiment, the filler is present in an amount greater than, or equal to, 20 weight percent, or greater than, or equal to, 35 weight percent, or greater than, or equal to, 30 weight percent based on the weight of the composition.

Applications

The invention also provides for an article comprising at least one component formed from an inventive composition. Articles include, but are not limited to carpets, flooring materials, artificial turf, molded goods, sheets, and extruded parts. Additional articles include automotive parts (for example, dashboards and window seals), computer parts, building materials, household appliances, toys, and footwear components.

Compositions may be formed into a finished article of manufacture by any one of a number of conventional processes and apparatus. Illustrative processes include, but are not limited to, extrusion, calendaring, injection molding, compression molding, and other typical processes known in the art. For example, articles can be prepared by injection molding, extrusion, extrusion followed by thermoforming, low pressure molding, compression molding, and the like. Articles may also be prepared by melt-in-place processes, such as a thermofix process.

Definitions

Unless stated to the contrary, implicit from the context, or customary in the art, all parts and percents are based on weight, and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The term "composition," as used herein, refers to a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and an α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The term, "propylene/α-olefin interpolymer," as used herein, refers to an interpolymer that comprises, in polymerized form, a majority amount of propylene monomer (based on the weight of the interpolymer), and an α-olefin.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene interpolymer," as used herein, refers to an interpolymer that comprises, in polymerized form, a majority amount of propylene monomer (based on the weight of the interpolymer), and ethylene.

The term, "propylene/ethylene copolymer," as used herein, refers to a copolymer that comprises, in polymerized form, a majority amount of propylene monomer (based on the weight of the copolymer), and ethylene, as the only two monomer types.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Growth Tension

Growth tension is a measure of the forces seen when a material is heated. Growth tension was measured using a TA Instrument RSA III (Rheometric Solids Analyzer III). Compression molded sheets of "0.8-1 mm" thickness were cut into "12.7 mm" width rectangular shape, and loaded into the instrument, as shown in FIG. 1. During the test, the strain and tension were set, so that the clamp distance (length) was fixed at 20 mm. A temperature ramp was programmed, at 20° C./min, to run from room temperature until melting. The force was recorded during the temperature ramp, from which the growth tension, as defined according to the Equation 1 below, was calculated. Positive force registers with growth tendency and negative force registers shrinking tendency, as shown in Equation 1:

$$\sigma(MPa) = \frac{F}{\text{Area}} = \frac{F(gf) * 0.0098 \ (N/gf)}{t(mm) * W(mm)}. \quad \text{(Eqn. 1)}$$

In Equation 1, σ is the growth tension, F is the growth force, "Area" is the cross-sectional area of the test sample, t is the thickness of the test sample, and W is the width of the test sample. A one point, a growth tension value at 40° C. was used throughout the study to provide for easier comparisons at an elevated temperature sometimes seen in the application. At least three repetitions were conducted on each composition, and the average reported.

Each "growth tension" test sample was cut from a compression molded plaque. The test sample dimensions were "½ in×2½ in". The actual mold size was "2½ in×3½ in." The molding conditions were as follows:

Using Carver Press—Set to 130° C.;

Place Sample on platen for 15 minutes to heat up;

Close press, open press, close press, open press;

Close press, then engage press program by closing till desired pressure is reached;

Program is: 3000 lb for 3.0 minutes; 10,000 lb for 3.0 minutes; and 20,000 lb for 1 minute; and cool at 20,000 lb for 1 to 2 minutes.

Flexural Modulus

Flexural modulus was measured in accordance with ASTM D-790. The composition was pressed under light pressure (6000 psi for 15 minutes), at 130° C., in a Wabash (Carver) press. Then the press was opened and closed three times to allow the material to soften and air to escape. The pressure was then increased to 15 tons (30,000 lbs), at which time, the press platens were cooled to a temperature less than 50° C., at a rate of 15° C./minute. Test bars, each "5 in×0.5 in×0.125 in" were die cut from the compression molded plaques (10 in×7 in×0.120 in). The test involved flexing the bar to failure with a loading nose moving at "0.05 inches/minute," as the bar sat on two radii that were two inches apart, in accordance with ASTM D-790. An INSTRON RENEW with "MTS Corporation TestWorks 4.0 software" was used to collect and calculate the data.

Tensile Test

Tensile tests were conducted in accordance with ASTM D-882. Each sample was compression molded, as discussed above for the flexural modulus. Type IV dog bone-shaped samples were then cut from the plaque, in accordance with FIG. 1 of ASTM D-638. Each test sample was pulled with an MTS QTES 50 LP Tensile Tester at "two inches per minute." Data was collected and analyzed using the "MTS Test Works" software.

Melt Index

Melt index (I2) was measured in accordance with ASTM D-1238 (190° C.; 2.16 kg). The result was reported in grams/10 minutes. Melt flow rate (MFR) was measured in accordance with ASTM D-1238 (230° C.; 2.16 kg). The result was reported in grams/10 minutes.

Density

Density was measured in accordance with ASTM D-792, Method B. Each sample was compression molded, as discussed above for the flexural modulus test. Isopropyl alcohol, at 23° C., was used for sample immersion.

Gel Permeation Chromatography (GPC)

Conventional GPC measurements are used to determine the weight-average (Mw) and number-average (Mn) molecular weight of the polymer, and to determine the MWD (=Mw/Mn). "Samples are analyzed with a high-temperature GPC instrument (Polymer Laboratories, Inc. model PL220).

The method employs the well-known universal calibration method, based on the concept of hydrodynamic volume, and the calibration is performed using narrow polystyrene (PS) standards, along with four mixed A, 20 μm columns (PLgel Mixed A from Agilent (formerly Polymer Laboratory Inc.)), operating at a system temperature of 140° C. Samples are prepared at a "2 mg/mL" concentration in 1,2,4-trichlorobenzene solvent. The flow rate is 1.0 mL/min, and the injection size is 100 microliters.

The molecular weight determination is deduced by using narrow molecular weight distribution polystyrene standards (from Polymer Laboratories), in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968) to derive the following equation:

$$M_{polyethylene} = a*(M_{polystyrene})^b.$$

In this equation, a=0.4316 and b=1.0. Weight average molecular weight (Mw) and number average molecular weight (Mn) are each calculated in the usual manner. For example, Mw is calculated the following formula: $Mw = \Sigma w_i M_i$, where $w_i$ and $M_i$ are the weight fraction and molecular weight, respectively, of the ith fraction eluting from the GPC column. Polyethylene equivalent molecular weight calculations were performed using Viscotek TriSEC software Version 3.0.

Differential Scanning Calorimetry (DSC)

Differential Scanning calorimetry (DSC) was used to measure crystallinity in ethylene-based (PE) samples and propylene-based (PP) samples. About 5 to 8 mg of film sample was weighed and placed in a DSC pan. The film sample was formed by pressing a "0.1 to 0.2 gram" sample at 190° C., 20000 psi, 30 seconds, to form a "1 mil thick" film. The lid was crimped on the pan to ensure a closed atmosphere. The sample pan was placed in a DSC cell, and then heated, at a rate of approximately 10° C./min, to a temperature of 180° C. for PE (230° C. for PP). The sample was kept at this temperature for three minutes. Then the sample was cooled at a rate of 10° C./min to −60° C. for PE (−40° C. for PP), and kept isothermally at that temperature for three minutes. The sample was next heated at a rate of 10° C./min, until complete melting (second heat). The percent crystallinity was calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer was determined from the second heat curve, and the crystallization temperature ($T_c$) was determined from the first cooling curve.

The following examples illustrate, but do not, either explicitly or by implication, limit the present invention.

Experimental

The polymers and additives used in this study are listed in Table 1. In Table 1, "EO" refers to an ethylene/octene copolymer. In Table 1, the notation "NA" means "not available." The polymers and additives, shown in Table 1, were used to make series of compositions, as shown in Table 2. All percentages are weight percentages, based on the weight of the composition.

The compositions shown in Table 2 were prepared in a HAAKE paddle mixer with a 400-gram bowl. The bowl temperature was set at 200° C. The polymeric materials, ethylene-based polymers and tackifier, were added first and allowed to melt. Then the filler was added gradually, and the mixture was then mixed for five minutes at ambient conditions (no nitrogen or other "pad" was utilized). The resulting "taffy-like" mixture was then removed from the paddles with spatulas. The materials were then wiped onto a MYLAR sheet for pressing. Each composition was then cold-pressed into a patty with a standard compression molding apparatus. The patties were allowed to cool to room temperature, and then chopped into small pieces for physical testing. Tensile properties, melt index and density are shown in Table 3.

TABLE 1

Polymers

| | | | | Raw Material | | | | | |
|---|---|---|---|---|---|---|---|---|---|
| | ENGAGE 8407 | ENGAGE 8401 | EO-4 | ENGAGE 8200 | AFFINITY PT1450 | LDPE 4012 | AMPLIFY GR204 | AMPLIFY GR216 | EASTOTAC H-115R | CELCERAM PV-20A |
| Description | Polymer A | Polymer A | Polymer A | Polymer A | Polymer C | Polymer C | Polymer B | Polymer B | Tackifier | Filler |
| Type | EO | EO | EO | EO | EO | LDPE | MAH-PE | MAH-PE | Hydrocarbon | Fly ash |
| Density (g/cc) | 0.870 | 0.885 | 0.913 | 0.870 | 0.902 | 0.918 | 0.954 | 0.875 | 1.04 | |
| Melt Index (I2) (g/10 min) | 30 | 30 | 30 | 5 | 7.5 | 12 | 12 | 1.25 | NA | NA |

TABLE 1-continued

| | Polymers | | | | | | | | |
|---|---|---|---|---|---|---|---|---|---|
| | Raw Material | | | | | | | | |
| | ENGAGE 8407 | ENGAGE 8401 | EO-4 | ENGAGE 8200 | AFFINITY PT1450 | LDPE 4012 | AMPLIFY GR204 | AMPLIFY GR216 | EASTOTAC H-115R | CELCERAM PV-20A |
| Total crystallinity (%) | 21 | 25 | | 19 | | | | | NA | NA |
| DSC Melting Peak (° C.) | 65 | 80 | | 59 | | | 127 | 63 | NA | NA |
| Glass Transition (° C.) | −54 | −47 | | −53 | | | | | NA | NA |
| MAH content (%) | NA | NA | NA | NA | NA | NA | Very high | High | NA | NA |
| Softening point (deg c.) | NA | NA | NA | NA | NA | NA | 121 VICAT | 40 VICAT | 115 ASTM E28 | NA |
| Mean particle size (microns) | NA | NA | NA | NA | NA | NA | NA | NA | NA | 10 |

TABLE 2

| | | | | | | | | | Compositions | | |
|---|---|---|---|---|---|---|---|---|---|---|---|
| Example # | % Polymer A | Polymer A | % Polymer B | Polymer B | % Polymer C | Polymer C | Tackifier | Filler | (A + C)/B | denC − denA | den(A + B + C) | Comment |
| Inventive 1 | 16 | ENGAGE 8401 | 4 | AMPLIFY GR216 | 10 | 12 MI, 0.918 g/cc | 60% Boral CFA | 10% EASTOTAC H-115R | 6.5 | 0.035 | 0.8944 | |
| Comparative A | 16 | EO-4 | 4 | AMPLIFY GR216 | 10 | 12 MI, 0.918 g/cc | 60% Boral CFA | 10% EASTOTAC H-115R | 6.5 | 0.007 | 0.9094 | A > 0.90 g/cc |
| Inventive 2 | 16 | ENGAGE 8407 | 4 | AMPLIFY GR216 | 10 | 12 MI, 0.918 g/cc | 60% Boral CFA | 10% EASTOTAC H-115R | 6.5 | 0.048 | 0.8861 | |
| Comparative B | 16 | ENGAGE 8200 | 4 | AMPLIFY GR216 | 10 | 12 MI, 0.918 g/cc | 60% Boral CFA | 10% EASTOTAC H-115R | 6.5 | 0.048 | 0.8861 | A < 10 MI |
| Inventive 3 | 18 | ENGAGE 8401 | 2 | AMPLIFY GR204 | 10 | 12 MI, 0.918 g/cc | 60% Boral CFA | 10% EASTOTAC H-115R | 14 | 0.035 | 0.9001 | |
| Comparative C | 14 | ENGAGE 8401 | 8 | AMPLIFY GR204 | 8 | 12 MI, 0.918 g/cc | 60% Boral CFA | 10% EASTOTAC H-115R | 2.75 | 0.035 | 0.9113 | |
| Comparative D | 9 | ENGAGE 8401 | 12 | AMPLIFY GR204 | 9 | 12 MI, 0.918 g/cc | 60% Boral CFA | 10% EASTOTAC H-115R | 1.5 | 0.035 | 0.9216 | (A + C)/B < 2 |
| Inventive 5 | 16 | ENGAGE 8407 | 4 | AMPLIFY GR216 | 10 | 7.5 MI, 0.902 g/cc | 60% Boral CFA | 10% EASTOTAC H-115R | 6.5 | 0.032 | 0.8811 | |
| Inventive 6 | 16 | ENGAGE 8407 | 4 | AMPLIFY GR216 | 10 | 7.5 MI, 0.902 g/cc | 60% Boral CFA | 10% EASTOTAC H-115R | 6.5 | 0.017 | 0.8892 | denC − denA < 0.020 |

TABLE 3

| | Properties | | | | | |
|---|---|---|---|---|---|---|
| | I2 | Density | Growth Tens | Flexural Modulus | Ult Elong | Ult Tens |
| Units | g/10 min | g/cc | psi @40 C. | kpsi | % | kpsi |
| N (# of samples) = | | | | | | |
| Example # | 4 | 3 | 3 | 5 | 5 | 5 |
| Inventive 1 | 9.4 +/− 0.387 | 1.531 +/− 0.0003 | 13.8 +/− 0.5 | 15 +/− 4 | 85 +/− 30 | 763 +/− 123 |
| Comparative A | 7.9 +/− 0.398 | 1.553 +/− 0.0009 | 22.2 +/− 0.3 | 48 +/− 6 | 7 +/− 3 | 1089 +/− 66 |
| Inventive 2 | 8.2 +/− 0.326 | 1.533 +/− 0.0015 | 9.2 +/− 0.2 | 11 +/− 1 | 95 +/− 76 | 594 +/− 65 |
| Comparative B | 3.1 +/− 0.063 | 1.529 +/− 0.0043 | 9.5 +/− 0.2 | 8 +/− 1 | 237 +/− 45 | 768 +/− 6 |

TABLE 3-continued

| | Properties | | | | | |
|---|---|---|---|---|---|---|
| | I2 | Density | Growth Tens | Flexural Modulus | Ult Elong | Ult Tens |
| | | | Units | | | |
| | g/10 min | g/cc | psi @40 C. | kpsi | % | kpsi |
| | | | N (# of samples) = | | | |
| Example # | 4 | 3 | 3 | 5 | 5 | 5 |
| Inventive 3 | 16.6 +/− 0.502 | 1.540 +/− 0.0013 | 19.5 +/− 0.5 | 41 +/− 3 | 30 +/− 9 | 900 +/− 12 |
| Comparative C | 14.5 +/− 0.450 | 1.559 +/− 0.0097 | 33.4 +/− 0.7 | 72 +/− 2 | 17 +/− 5 | 1139 +/− 22 |
| Comparative D | 8.8 +/− 0.357 | 1.562 +/− 0.0024 | 38.4 +/− 1.4 | 101 +/− 15 | 3 +/− 2 | 1433 +/− 222 |
| Inventive 5 | 7.6 +/− 0.063 | 1.525 +/− 0.0060 | 7.9 +/− 0.3 | 5 +/− 0 | 205 +/− 39 | 666 +/− 21 |
| Inventive 6 | 6.8 +/− 0.229 | 1.535 +/− 0.0015 | 11.2 +/− 0.3 | 10 +/− 1 | 160 +/− 41 | 822 +/− 27 |

NOTE:
+/− indicates one standard deviation.

The inventive and comparative examples were run in sets to demonstrate the effect of various parameters. In the first set, comparing Inventive 1 and Comparative A, the only parameter that was changed was the "A polymer" density. This higher density (0.913 vs. 0.885 g/cc) clearly increases the growth tension, the tensile modulus, and the ultimate tensile. The much higher (>60%) growth tension of the Comparative A composition would lead to a greater likelihood of expansion and buckling issues in tile backing compositions.

The next set (Inventive 2 versus Comparative B) looked at changing only the melt index of polymer A. Dropping the melt index from 30 to 5 dropped the corresponding formulations melt index from 8.2 to 3.1. This would result in much higher back pressure in formulating such a composition, and ultimately would limit the production rate of a tile line, for a tile backing composition.

The third comparison (Inventive 3 and Comparatives C and D) looked into the affect of changing the ratio of "(polymer A+polymer C)/polymer B." This was done by changing the amount of polymer B. The data clearly shows that as this ratio is dropped, the growth tension begins to increase significantly. Therefore, improved "composition dimensional stability" will be demonstrated by compositions that have higher ratios of "(polymer A+polymer C)/polymer B," as claimed.

The last data set shows the effect of changing the density difference between A and C. When that difference was decreased (see Comparative A), the growth tension increased. This indicates that larger differences in density would be better for a dimensionally stable of the final tile backing composition.

Although the invention has been described in considerable detail in the preceding examples, this detail is for the purpose of illustration, and is not to be construed as a limitation on the invention, as described in the following claims.

The invention claimed is:
1. A composition comprising at least the following:
   A) an ethylene/α-olefin interpolymer with a density less than, or equal to, 0.90 g/cc, I2 greater than, or equal to, 20;
   B) a functionalized olefin-based polymer; and
   C) an olefin-based polymer with a density greater than 0.90 g/cc, and selected from the group consisting of the following:
   a) an ethylene homopolymer,
   b) an ethylene/α-olefin interpolymer,
   c) a propylene/ethylene interpolymer, and
   d) a propylene/α-olefin interpolymer; and
   wherein the [density (C)−density (A)] is greater than, or equal to, 0.017;
   and wherein the weight ratio of [(A +C) / B] is greater than, or equal to, 3.0; and
   wherein the composition has a density less than, or equal to, 0.900 g/cc.

2. The composition of claim 1, wherein weight ratio of "component A to component C" is greater than, or equal to, 1.

3. The composition of claim 1, wherein the wherein weight ratio of "component A to component C" is from 1 to 5.

4. The composition of claim 1, wherein the α-olefin of the ethylene/α-olefin interpolymer of component A is a C3-C10 α-olefin.

5. The composition of claim 1, wherein the ethylene/α-olefin interpolymer of component A has a melt index (I2) from 20 to 100 g/10 min.

6. The composition of claim 1, wherein the ethylene/α-olefin interpolymer of component A has an I2 greater than, or equal to, 25.

7. The composition of claim 1, wherein the ethylene/α-olefin interpolymer of component A has an I2 greater than, or equal to, 30.

8. The composition of claim 1, wherein the ethylene/α-olefin interpolymer of component A is a homogeneously branched linear interpolymer or a homogeneously branched substantially linear interpolymer.

9. The composition of claim 1, wherein the weight ratio of [(A +C)/B] is greater than, or equal to, 5.0.

10. The composition of claim 1, wherein component B is present in an amount less than, or equal to, 4 weight percent, based on the weight of the composition.

11. The composition of claim 1, wherein the functionalized olefin-based polymer of component B has a melt index (I2) from 1 to 10 g/10 min.

12. The composition of claim 11, wherein the functionalized olefin-based polymer of component B has a density from 0.86 to 0.95 g/cc.

13. The composition of claim 12, wherein the ethylene/α-olefin interpolymer of component A is a homogeneously branched linear interpolymer or a homogeneously branched substantially linear interpolymer.

14. The composition of claim 1, wherein the composition has a melt index (I2) greater than 10 g/10 min.

15. The composition of claim 1, further comprising one or more additives.

16. The composition of claim 15, wherein the one or more additives are selected from fillers, tackifiers, or combinations thereof.

17. An article comprising at least one component formed from the composition of claim 1.

18. The article of claim 17, wherein the article is a carpet.

* * * * *